US006461166B1

(12) United States Patent
Berman

(10) Patent No.: US 6,461,166 B1
(45) Date of Patent: Oct. 8, 2002

(54) LEARNING SYSTEM WITH LEARNER-CONSTRUCTED RESPONSE BASED TESTING METHODOLOGY

(75) Inventor: Dennis Ray Berman, 4401 Windsor Ridge Dr., Irving, TX (US) 75083

(73) Assignee: Dennis Ray Berman, Irving, TX (US)

( * ) Notice: Subject to any disclaimer, the term of this patent is extended or adjusted under 35 U.S.C. 154(b) by 69 days.

(21) Appl. No.: 09/690,223

(22) Filed: Oct. 17, 2000

(51) Int. Cl.[7] ................................................ G09B 7/00
(52) U.S. Cl. ..................... 434/323; 434/322; 434/353
(58) Field of Search ............................ 434/156, 157, 434/322, 323, 350, 362, 353

(56) References Cited

U.S. PATENT DOCUMENTS

| 4,958,284 | A | * | 9/1990 | Bishop et al. ........... 434/353 X |
| 5,002,865 | A | | 3/1991 | Kumashiro et al. |
| 5,011,413 | A | * | 4/1991 | Ferris et al. ............ 434/358 X |
| 5,987,302 | A | * | 11/1999 | Driscoll et al. ......... 434/353 X |
| 6,115,683 | A | * | 9/2000 | Burstein et al. ............. 704/1 X |
| 6,120,297 | A | | 9/2000 | Morse, III et al. |
| 6,168,440 | B1 | * | 1/2001 | Clark et al. ............. 434/322 X |
| 6,181,909 | B1 | * | 1/2001 | Burstein et al. ......... 434/353 X |
| 6,226,611 | B1 | * | 5/2001 | Neumeyer et al. ...... 704/246 X |
| 6,254,395 | B1 | * | 7/2001 | Breland et al. ......... 434/156 X |
| 6,256,399 | B1 | * | 7/2001 | Poor ....................... 382/100 X |
| 6,267,601 | B1 | * | 7/2001 | Jongsma et al. ........ 434/323 X |
| 6,282,404 | B1 | | 8/2001 | Linton |
| 6,287,123 | B1 | * | 9/2001 | O'Brien .................. 434/118 X |
| 6,292,792 | B1 | | 9/2001 | Baffes et al. |
| 6,295,439 | B1 | * | 9/2001 | Bejar et al. ............. 434/350 X |
| 6,302,698 | B1 | * | 10/2001 | Ziv-El ..................... 434/323 X |
| 6,311,040 | B1 | * | 10/2001 | Kucinski et al. ........ 434/350 X |
| 6,343,935 | B1 | | 2/2002 | Clements |
| 6,356,864 | B1 | * | 3/2002 | Foltz et al. ................. 704/1 X |

* cited by examiner

Primary Examiner—Joe H. Cheng
Assistant Examiner—Chanda Harris
(74) Attorney, Agent, or Firm—Haynes and Boone, LLP

(57) ABSTRACT

A methodology in which a learner-constructed response is provided in answer to a question presented by the system, the response being evaluated by comparison with pre-defined expected responses and, based upon the evaluation, the system determining whether to proceed to another question or to offer remedial feedback. Such a learner-constructed response based evaluation methodology greatly reduces the potential for "guess-work" based correct responses and improves the training process through remedial feedback and advancement upon demonstration of knowledge.

9 Claims, 4 Drawing Sheets

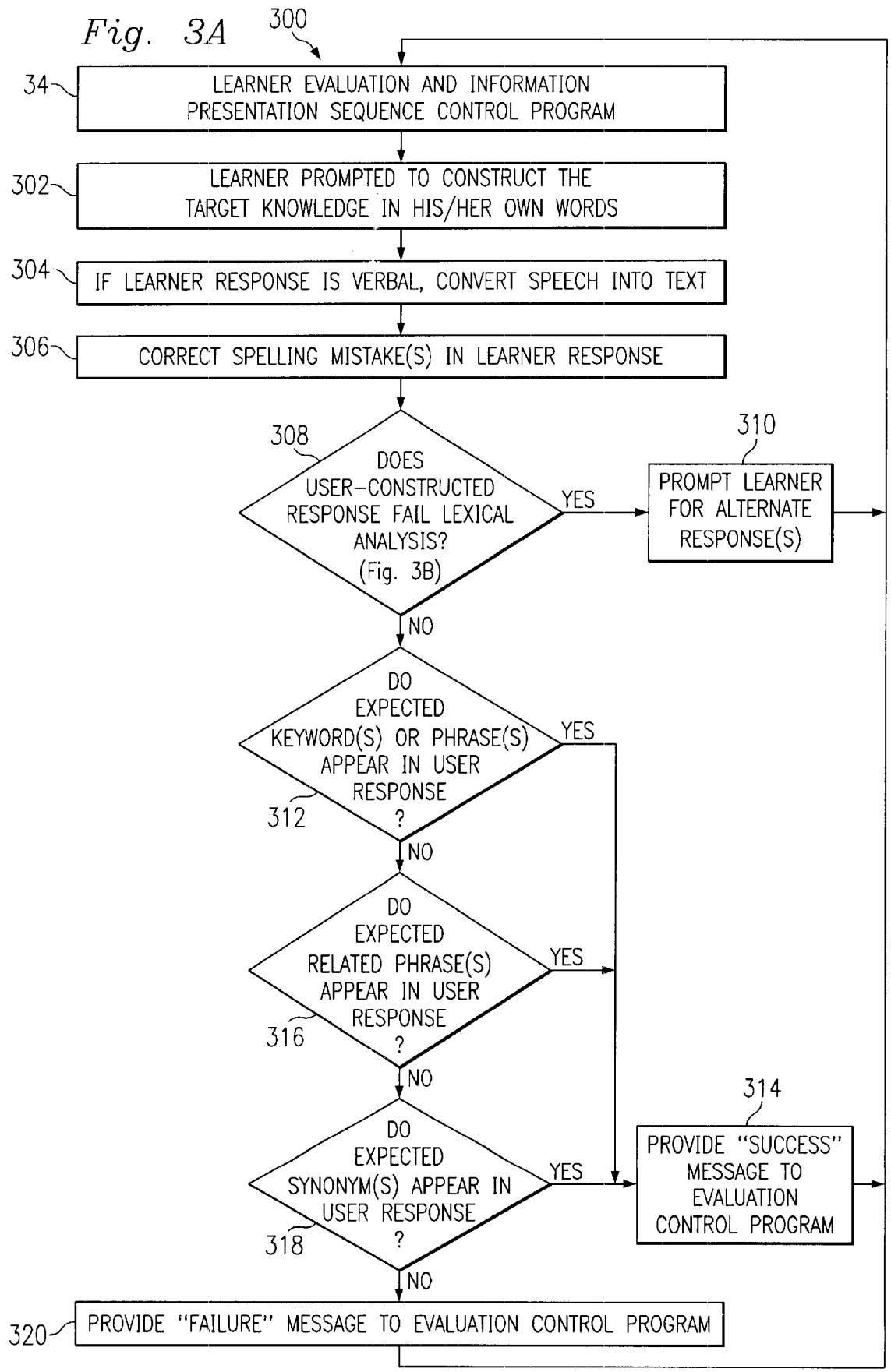

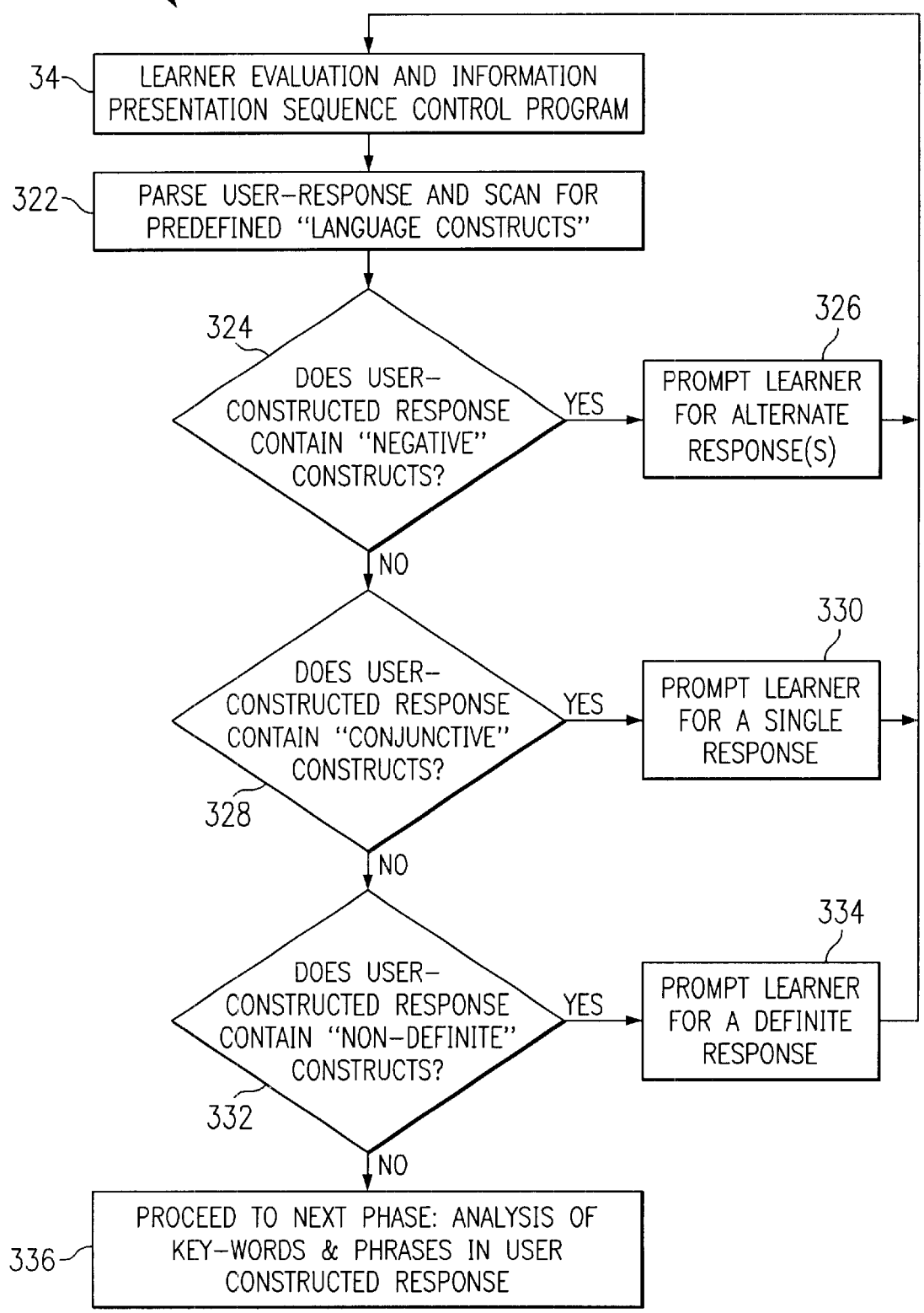

LEARNING SYSTEM WITH LEARNER-CONSTRUCTED RESPONSE BASED TESTING METHODOLOGY

BACKGROUND

This invention relates to systems and methods for personnel training and, more particularly, to supervised or self-administered computer-based training systems that incorporate a learner-constructed response based testing methodology for improved evaluation of knowledge acquisition.

A variety of systems are available for automated learning and training using computers or other personal electronic devices. In current computer mediated learning and training systems, assessment of the "knowledge" gained by the user is carried out by, for example, true/false questions, matching (paired-associate) type questions, multiple choice questions, and marking questions. A multiple choice question differs from a marking question in that a multiple choice question has one correct answer, while a marking question has multiple correct answers. The foregoing question formats are not fully effective as learning aids, nor are they reliable in assessing actual knowledge, for various reasons. For example, in a true/false question, a learner has a fifty-fifty chance of answering correctly by guessing; in a four way multiple choice question, the probability of a correct answer through guessing is twenty five percent. Test results thus are not necessarily indicative of actual knowledge.

What is needed, therefore, is a methodology for use in computer based training that provides for improved learning, improved efficiency, and improved reliability in the assessment of a user's actual knowledge of subject matter.

SUMMARY

This invention provides a methodology in which a learner-constructed response is provided in answer to a question presented by the system, the response being evaluated by comparison with pre-defined expected responses and, based upon the evaluation, the system determining whether to proceed to another question or to offer remedial feedback. Such a learner-constructed response based evaluation methodology greatly reduces the potential for "guesswork" based correct responses and improves the training process through remedial feedback and advancement upon demonstration of knowledge.

Evaluation of responses involves identification of pre-defined keyword data pertaining to the subject matter being tested. Examples include passages of text with important keywords (keywords being defined herein to include one or more words, or phrases, or related words and phrases, or synonyms). Multiple choice questions may also include keywords, such that after the learner completes a sequence of reading material or any kind of current multiple-choice, mix or match, true false questions, the learner is prompted to enter answers to "fill-in-the-blank" or "verbal narrative" questions (a learner-constructed response). The learner entered responses are compared to standard solutions recorded on the system and remedial actions are provided.

The methodology may be used in a specially designed training system or in cooperation with existing computer based training systems. For every "choice" based question (e.g., multiple choice), for example, the methodology may prompt for a "user-constructed response" based upon a question that has associated with it all acceptable correct user-constructed responses to this question, the presentation to the learner being designed to include an area or mechanism for capturing a learner response either in the form of text or spoken words. The correct response is recognized if the response matches the keyword(s), e.g., primary/related keyword(s) or phrase(s) and/or synonym(s).

In one implementation, a computer program is provided for implementing a learning system with a learner-constructed response based methodology, the program including a presentation process for presenting at least one knowledge topic to the learner and for prompting the learner to enter a learner constructed response thereto; an evaluation information process for providing keyword data that corresponds to the knowledge topic; and an evaluation process for determining, based upon entry of a learner-constructed response to the knowledge topic, success or failure of the learner to know the knowledge topic, the success or failure being determined by comparison of the learner-constructed response with the keyword data.

BRIEF DESCRIPTION OF THE DRAWINGS

FIGS. 3A and 3B are flow charts illustrating processes of the learning methodology.

DETAILED DESCRIPTION

Figure 1:
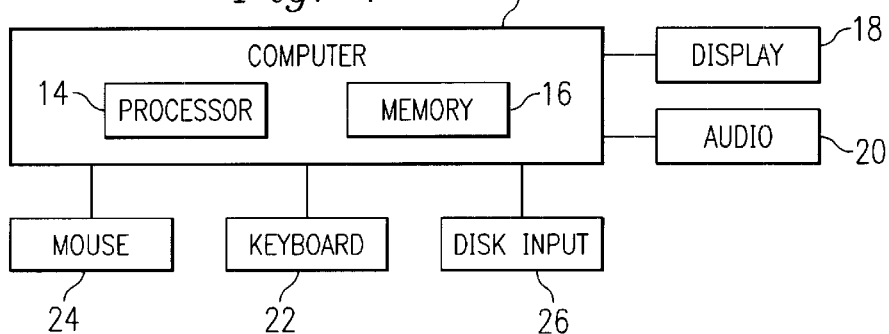
FIG. 1 is a schematic block diagram illustrating a system for implementing a learning methodology of the present invention.

In FIG. 1, the reference numeral 10 refers to a system for implementing a training methodology of the present invention, described in detail below. The system 10 includes a computer 12, having a processor 14 and a memory 16. It is understood that the computer 12 may comprise a personal or desktop computer, a television, a handheld device, or any other suitable electronic device. A display 18 and audio output 20 are connected to the computer. Inputs include a user keyboard 22, a mouse 24, or other suitable devices. The inputs are used for various purposes such as entering information initiated by the user, interacting with a software application running on the computer, etc. A disc input 26 is provided for providing programming or content for operation on the system 10, it being understood that any suitable media may be contemplated.

Programming, as discussed in detail below for implementing the present learning methodology, is stored on disc input 26 and/or memory 16 and is executed by the system 10. The learning methodology preferably is practiced using the foregoing system components, although it may be practiced with alternative components.

Figure 2A:
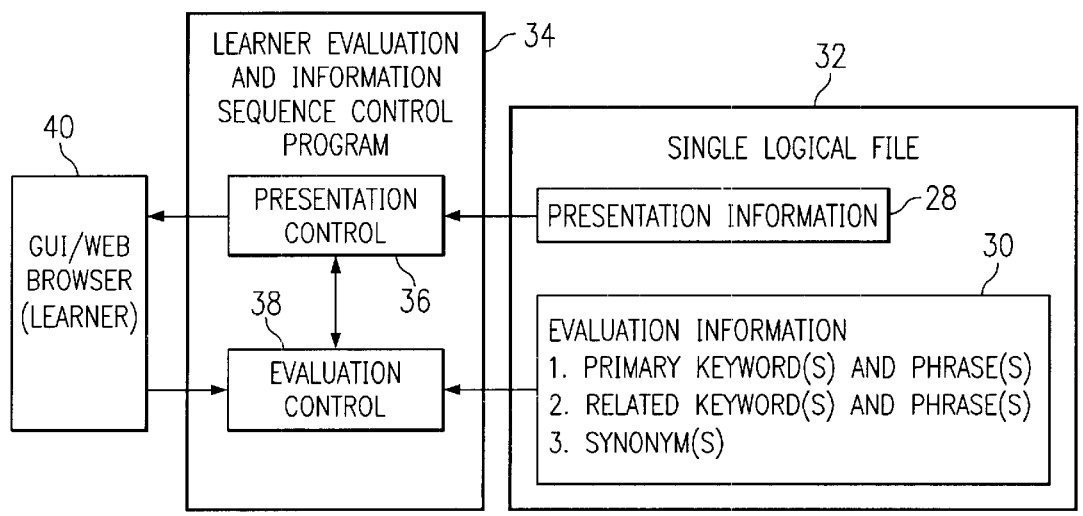
FIGS. 2A–2C are schematic representations illustrating components and question formats for the learning methodology.
Figure 2B:
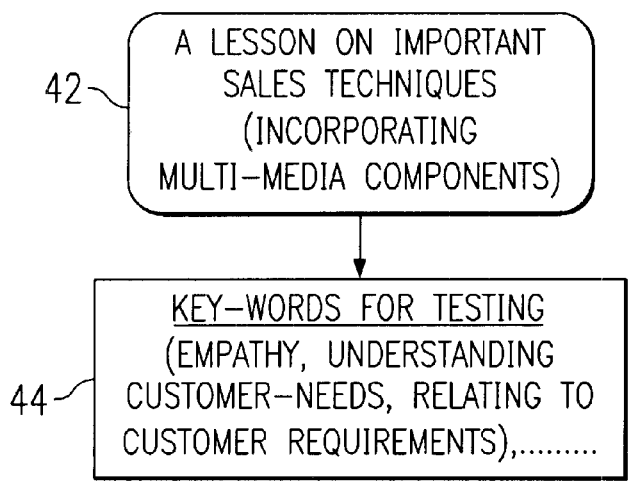
Figure 2C:
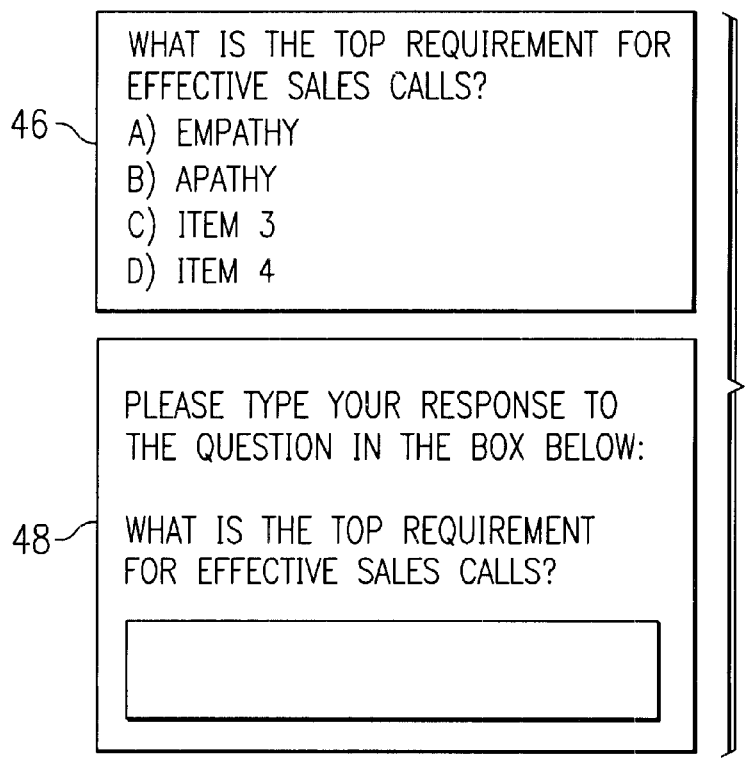

FIGS. 2A–2C illustrate schematically an example implementation of the learning methodology in which presentation information component 28 is associated with evaluation information component 30. A logical file 32 has encoded therein the components 28, 30 (it being understood that they may in some embodiments be encoded in distinct files). A learner evaluation and control program 34, including instructions for presentation control 36 and evaluation control 38, are provided to implement the methodology using the information contained in the file(s) 32. A graphical user interface (GULI) 40 operates with the program 34 for providing the presentation and interaction with the learner, it being understood that the GUI 40 may be implemented using commercially available software including, but not limited to, a web browser. The file(s) 32, program 34, and GUI 40 are understood to operate in conjunction with standard software on the computer 12 of the system 10, and may be stored in memory 16, disk input 26, or as otherwise appropriate for efficient operation.

The presentation information component 28 contains information for presenting the question, and may also include additional instructions, help information and an avenue for capturing learner-constructed responses (e.g., a text area or a record button for voice input). The evaluation information component 30 may include a sequence of phrases and, in one embodiment, these may take the form of standard HTML tags for the display of question information and a sequence of proprietary tags for the encoding of expected key-words or phrases under the "META-DATA" tag in HTML.

Referring to FIGS. 2A and 2B, in one example the presentation information information 28 includes a target knowledge component 42 comprising subject matter content for presentation (e.g., display) to a learner. As illustrated, example content may comprise a lesson on important sales techniques, to be presented in any variety of ways to the learner (e.g., text, video, graphics, sound). The evaluation information component 30 includes keywords that may include one or more primary keywords and/or phrases, related keywords and/or phrases, and/or synonyms. The keywords may also be formatted to identify negative constructs (wrong answers) and flag them. In the example of FIG. 2B, the evaluation information component includes keyword component 44 as an associated set of words relevant to the target knowledge component 42. For example, keywords may describe one or more words or phrases that express the gist or main concepts of the topic under discussion, or the main concepts of a training session to be conveyed to the learners. Keywords may comprise one word, phrases, multiple associated words, synonyms and/or related phrases. For example, keywords may be organized as an n-tuple of consisting of one main word or phrase, followed by associated synonyms and related phrases. Keywords in the component 44 as illustrated in the example of FIG. 2B that correspond to the target knowledge component 42 are empathy, understanding customer needs, relating to customer requirements. It is understood that the authors of "content" for the system 10 will supply the target knowledge for the presentation information component 28 and the keywords for the evaluation information component 30, corresponding to each passage or item to be tested in the component 28. It is understood that the target knowledge of the component 28 may be expressed as text passages, graphics, video, or multiple choice questions, or in some other fashion.

The program 34 enables creation of the components 42, 44 for a desired training session. During the creation of the training "content" the authors are prompted to create different key-words and phrases that best describe the "gist" of the content or embody the essence of the knowledge topic under discussion. These key-words and phrases are utilized for the construction of questions. These key-words may also be analyzed to produce additional key-words, phrases or synonyms, and identify negative constructs (wrong answers).

Referring to FIG. 2C, illustrated are example question formats 46 and 48. Once the target knowledge component 42 is presented to the learner, a series of test questions may be provided to the learner. It is also understood that the target knowledge component 42 may itself take the form of multiple choice or other question or question/answer formats. As illustrated by the question format 48, eventually the learner will be presented with a question format that requires the learner to construct a response to a question about the target knowledge in which the learner must construct the target knowledge in his or her own words. The example illustrated is the format 48 in which the learner is prompted to fill in a blank in response to a displayed question. Other scenarios are similarly envisioned in which the learner must express an answer (audibly or in writing) in his or her own word or words. As described below, the learner's words are evaluated by the system 10 to determine whether remediation, further testing, or advancement to new material is appropriate.

FIG. 3A is a functional block diagram describing steps of an evaluation process 300 of the learning methodology as implemented by the program 34 operating on the computer 12 of the system 10, for example. FIG. 3B describes lexical pre-processing of a user-constructed response to eliminate negative, conjunctive, and non-definitive language constructs in the user-constructed response.

Referring to the process 300, in step 302 the learner is prompted to construct the target knowledge (presented previously, as described above) in his or her own words. One example of the prompt is the fill-in-the-blank format 48, above. In step 304, if the learner's response is verbal, the speech is converted into text data. After the learner's response has been fully entered, a comparison can be triggered automatically in a predetermined manner. For example, the learner can hit a particular key on the keyboard (e.g., an "Enter" key) or activate a particular area on the display screen to start the comparison. In step 306, the comparison is performed of the learner's response with the pre-defined key word data contained in the evaluation information component 30 (FIG. 2A). The comparison may involve a variety of analyses. For example, the comparison may:

(1) check for and correct spelling mistakes in the learner-constructed response;

(2) determine whether the correct key word (words, phrases) appear in the learner-constructed response;

(3) determine whether synonyms of missing key word(s) appear in the learner-constructed response;

(4) determine whether related phrases that convey the same meaning as the expected key word(s) or phrases appear in the learner-constructed response;

(5) determine whether there are any incorrect key word(s) or phrases in the learner-constructed response or other negative constructs that might indicate a wrong answer.

A variety of logic selections for evaluation are contemplated. In one example, for purposes of improved learning and expediting the testing, a decision is made in step 308 of whether the learner response fails a lexical analysis (described more fully in FIG. 3B), thereby indicating a possible wrong answer or misunderstanding. If yes, then in step 310 the methodology prompts the user for a positive construct. If not, in step 312 a determination is made whether or not expected keyword(s) are found in the response, albeit not necessarily in the exact way or phraseology preferred. If yes, then the methodology proceeds to step 314 and provides a success message to the evaluation control program and execution returns to the program for testing of other target knowledge topics. If not, then in step 316 a determination is made whether expected related phrase(s) are found in the learner's response (thus indicating a correct or partially correct answer). If yes, execution proceeds to step 314. If not, in step 318 a determination is made whether expected synonym(s) appear in the learner response, thereby indicating a correct or partially correct answer. If yes, execution proceeds to step 314. If not, the methodology proceeds to step 320. In step 320, a "failure" message is sent to the evaluation control program 34.

Possible scenarios of a "failure" message to the evaluation control program 34 are that the evaluation control program may:

(1) Proceed to other questions and come back to the question upon which failure is indicated, until a satisfactory answer is received.

(2) Offer remedial questions or target information;

(3) Re-evaluate the learner with a focus on the missed part of the current topic.

Possible scenarios of a "success" message to the evaluation control program 34 are that the evaluation control program may:

(1) Discontinue further questioning on the target knowledge subject;

(2) Question the learner on the target knowledge again or in a different way to confirm understanding.

Referring to FIG. 3B, a lexical pre-processing algorithm 308 (described generally in FIG. 3A) is provided that eliminates negative, conjunctive, and non-definitive language constructs in user-constructed responses. In step 322, a user-constructed response is parsed and scanned for predefined language constructs.

In step 324, if the response contains negative constructs, the learner is prompted in step 326 for alternative responses. For example, if the learner types "no empathy" or "not empathy" or "don't XXX" or "can't YYY" a parsing algorithm that looks for "empathy" or "XXX" or "YYY" will normally flag this as correct even though the negative construct makes the meaning totally different. Accordingly, step 324 determines that the answer with the negative construct is incorrect and proceeds to step 326.

If in step 324 there are no negative constructs, in step 328 a determination is made whether the user-constructed response contains a "conjunctive" construct and, if so, in step 330 prompts the learner for a single response. As an example, if "and" or "but" or "or" are included in the answer, to indicate a possible guess or two possible answers, step 328 determines that the user-constructed response is not correct and prompts the learner in step 330.

If in step 328 there are no conjunctive constructs, a determination in step 332 whether there are non-definite constructs, and if so, prompts the learner for a definite response. Example non-definite constructs include, e.g., "maybe" or "perhaps."

If in step 332 there are no non-definite constructs, in step 336 execution proceeds to the next phase of the analysis, as further described in step 312 of FIG. 3A (described above).

It is noted that at any given moment during the execution of the above mentioned learning methodology, various information pertaining to the training session or the performance of the learner is collected by the system 10 for different purposes. In one specific case, at the end of a training session, the collected information gives an in-depth view of how well the learner has been trained. The collected information can be analyzed to generate various reports to be delivered to a predetermined interested party. For instance, the analyzed information will help to identify comparative difficulties of different materials or subjects covered in the training session, or provide information on how the learner has performed on a per question basis, etc. A statistical analysis and report can also be generated in a similar fashion based on the performances of a group of learners with regard to the training session. Therefore, the interested party can evaluate the performance of a group of learners to make various decisions such as to determine whether the training session should be revised, or whether the group of learners can be profiled in a certain manner.

In summary, the system 10 provides a learning methodology that improves the speed and retention of learning, and furthermore provides improved accuracy in assessment of the learner. By requiring, perhaps in addition to traditional multiple choice or other testing techniques, a learner-constructed response in which the learner must use his or her own words in answering a question, greater assurance is provided that the learner indeed knows the subject matter. Also, the system allows for refinement of the testing as the learner gets closer to accurate responses, as enabled by the construction of a key word component associated with the target knowledge component, as enabled by the evaluation process.

Although illustrative embodiments of the invention have been shown and described, other modifications, changes, and substitutions are intended in the foregoing disclosure. Accordingly, it is appropriate that the appended claims be construed broadly and in a manner consistent with the scope of the invention.

What is claimed is:

1. A computer program for implementing a learning system with a learner-constructed response based methodology, comprising:

a presentation process for presenting at least one knowledge topic to the learner and for prompting the learner to enter a learner constructed response thereto;

an evaluation information process for providing keyword data that corresponds to the knowledge topic; and an evaluation process for determining, based upon entry of a learner-constructed response to the knowledge topic, success or failure of the learner to know the knowledge topic, the success or failure being determined by comparison of the learner-constructed response with the keyword data wherein upon a determination of failure of the learner, remedial information is provided to the learner before the learner is prompted to enter another learner-constructed response.

2. The program of claim 1 wherein the comparison comprises a determination of whether or not expected keyword data appears in the learner-constructed response, the keyword data comprising at least one synonym.

3. A method for implementing an automated learning system comprising:

presenting at least one knowledge topic to the learner and for prompting the learner to enter a learner constructed response thereto;

comparing keyword data that corresponds to the knowledge topic with the learner-constructed response; and determining success or failure of the learner to know the knowledge topic, the success or failure being determined by whether or not expected keyword data appears in the learner-constructed response, wherein upon a determination of failure of the learner, remedial information is provided to the learner before the learner is prompted to enter another learner-constructed response.

4. A method for implementing an automated learning system comprising:

presenting a series of knowledge topics to the learner and prompting the learner to enter a learner constructed response to each topic;

comparing keyword data that corresponds to the knowledge topics with the learner-constructed responses; and determining success or failure of the learner to know each of the knowledge topic, the success or failure being determined by whether or not expected keyword data appears in the learner-constructed response;

upon a determination of failure of the learner, providing remedial information to the learner and again prompting the learner to enter a learner-constructed response upon a determination of success of the learner, discontinuing presentation and prompting of the learner regarding the particular knowledge topic;

whereupon automated presentation of the series is completed when success is determined for each knowledge topic.

5. The method of claim 4 wherein the comparing comprises a determination of whether or not expected keyword data appears in the learner-constructed response, the keyword data comprising at least one exact keyword.

6. The method of claim 4 wherein the comparing comprises a determination of whether or not expected keyword data appears in the learner-constructed response, the keyword data comprising at least one exact phrase.

7. The method of claim 4 wherein the comparing comprises a determination of whether or not expected keyword data appears in the learner-constructed response, the keyword data comprising at least one synonym.

8. The method of claim 4 wherein the comparing comprises a determination of whether or not the learner-constructed response fails a lexical analysis.

9. The method of claim 4 further comprising:

collecting information regarding a performance of at least one learner during the presentation process, the evaluation information process and the evaluation process;

analyzing the collected information; and generating a report based on the analyzed information for at least one predetermined party.

* * * * *